(12) United States Patent
Fangmeier

(10) Patent No.: US 7,431,048 B2
(45) Date of Patent: Oct. 7, 2008

(54) BACKFLOW PREVENTER

(75) Inventor: Martin Fangmeier, Auggen (DE)

(73) Assignee: Neoperl GmbH, Mullheim (DE)

( * ) Notice: Subject to any disclaimer, the term of this patent is extended or adjusted under 35 U.S.C. 154(b) by 100 days.

(21) Appl. No.: 10/572,915

(22) PCT Filed: Sep. 22, 2004

(86) PCT No.: PCT/EP2004/010837

§ 371 (c)(1),
(2), (4) Date: Mar. 21, 2006

(87) PCT Pub. No.: WO2005/052421

PCT Pub. Date: Jun. 9, 2005

(65) Prior Publication Data

US 2006/0260684 A1    Nov. 23, 2006

(30) Foreign Application Priority Data

Nov. 3, 2003   (DE) .............. 203 16 977 U

(51) Int. Cl.
*F16K 24/00* (2006.01)
(52) U.S. Cl. .......... 137/542; 137/543.21; 137/533.31; 137/533.17
(58) Field of Classification Search ........... 137/533.17, 137/533.31, 542, 543, 543.21
See application file for complete search history.

(56) References Cited

U.S. PATENT DOCUMENTS

| | | | |
|---|---|---|---|
| 2,641,278 A | * | 6/1953 | Eplett et al. ................. 137/542 |
| 4,203,466 A | * | 5/1980 | Hager ......................... 137/543 |
| 4,862,913 A | | 9/1989 | Wildfang |
| 5,370,150 A | * | 12/1994 | Nehm ....................... 137/454.2 |
| 2004/0238043 A1 | | 12/2004 | Arnold et al. |

FOREIGN PATENT DOCUMENTS

| | | |
|---|---|---|
| DE | 7 045 248 | 3/1971 |
| DE | 87 03 945 | 6/1987 |
| DE | 196 10 778 | 9/1997 |
| DE | 296 20 916 | 5/1998 |
| DE | 296 20 927 | 5/1998 |
| EP | 0 287 289 | 10/1988 |

(Continued)

*Primary Examiner*—Kevin L Lee
(74) *Attorney, Agent, or Firm*—Volpe And Koenig, P.C.

(57) ABSTRACT

A backflow preventer (1) is provided that, in an insertable housing (2) thereof, includes a valve member (6) located in a housing interior (5). The valve member (6) sealingly rests against a valve seat (7) in the closed position thereof while being movable from the closed position thereof into the open position thereof counter to a restoring force. The interior (5) of the housing is provided with an interior section (A) which has an interior cross section that is larger than the outer circumference of the valve member in the movement zone of the valve member (6). In order to prevent undesired noise from developing as a result of the valve member (6) vibrating on the inner circumference of the housing when the quantity of flow medium is low, the invention provides an elastic valve member guide (9) at least in a movement zone of the backflow preventer (1) near the valve seat (7), that is effective between the valve member (6) and the interior housing wall surrounding the interior section (A) to guide the valve member (6) in a play free manner.

6 Claims, 2 Drawing Sheets

FOREIGN PATENT DOCUMENTS

| | | |
|---|---|---|
| FR | 2 559 872 | 8/1985 |
| FR | 2 665 503 | 2/1992 |
| GB | 661749 | 11/1951 |
| GB | 1031226 | 6/1966 |
| GB | 2 266 757 | 11/1993 |

* cited by examiner

BACKFLOW PREVENTER

BACKGROUND

The invention relates to backflow preventer that, in an insertable housing thereof, includes a valve member located in a housing interior. The valve member sealingly rests against a valve seat in the closed position thereof while being movable from the closed position thereof into the open position thereof counter to a restoring force. The interior of the housing is provided with an interior section which has an interior cross section that is larger than the outer circumference of the valve member in the movement zone of the valve member.

From DE 37 22 665 C2, a backflow preventer is already known, which can be inserted in gas or water lines and thus in sanitation flow lines. The known backflow preventer has a valve member arranged in an outer housing. This valve member can be shifted by the restoring force of a restoring spring acting on the member counter the flow direction against the valve seat. Here, the valve member is guided in a separate guide cage located in the outer housing. This cage has guide ridges, which extend in the direction of the shifting path of the valve member, which project radially inwards, and which are connected to each other by a common base and are held on both sides in the outer housing.

The supply-side end of these guide ridges is arranged with spacing underneath the valve seat. Between the valve seat forming a seal with the valve member in the closed position on one side and the supply-side end of the guide ridges on the other side, an interior section is provided, which has an open cross section expanded relative to the outer periphery of the valve body. However, the problem arises, especially for low flow rates, which lift the valve member only slightly from the valve seat, that the valve member starts to vibrate due to the flowing fluid in the course of its shifting movement in the expanded interior section. These vibrations can strike the valve member like a bell on the outer housing, making it noticeable as an unpleasant rattling noise. This rattling noise can be heard, possibly throughout the entire building, through the sanitation-system supply line.

From GB 661 479 A, a hydraulic shock absorber is already known, which has a two-port valve in the interior of its shock-absorber housing. The two-port valve of the known shock absorber has a valve housing with an inner ring flange, which acts as a valve seat for a closing body. The closing body has, on its die, a flow-through channel, in which is provided a non-return valve active in the opposite flow-through direction. When the shock absorber moves, in the interior of the shock-absorber housing a low pressure is generated, which lifts the closing body from its valve seat until its lifting movement is limited by spring-elastic, finger-like stops projecting inwards and arranged in a radiating pattern relative to each other.

However, in the applications of a hydraulic shock absorber, those noises, which could be generated in the interior of the shock absorber just by the flowing hydraulic fluid are of no importance whatsoever. A play-free lifting movement in the radial direction is therefore not a goal—instead in the shock absorber known from GB 661 479 A, the finger-like stops should limit the lifting movement of the closing body in the axial direction caused by the low pressure.

SUMMARY

Therefore, there is the objective of creating a backflow preventer of the type named above, which does not become noticeable through the generation of disruptive noise even for low flow rates.

For the backflow preventer of the type named above, the solution according to the invention to meet his objective is characterized in that, especially for no-play guidance of the valve member, a spring-elastic valve member guide is provided, which acts between the valve body and the housing inner wall surrounding the interior section.

The backflow preventer according to the invention has a spring-elastic valve member guide, which is effective between the valve member and the housing inner wall surrounding the interior section. This valve member guide holds the valve member, preferably at least in its movement zone near to the valve seat, without play in the insert housing, such that disruptive rattling noise due to a valve member vibrating in the insert housing cannot be generated.

To be able to guide the valve body over its entire valve body periphery in the insert housing with as little play as possible, it is useful if the valve member guide has at least two, preferably more than two spring arms, which contact the housing inner wall and/or the valve member.

A simple embodiment according to the invention provides, for example, that the spring arms are formed on the inside of the insert housing or similarly held on the inert housing and are preferably arranged with their free spring arm end in the region of the valve seat. For this embodiment, the spring arms formed on the insert housing or similarly held on the insert housing already contact the valve member in the region of the valve seat with their spring-elastic spring arm end regions.

However, in another embodiment according to the invention, the spring arms are formed on the valve member or similarly held on the valve member and contact the housing inner wall with their free spring arm end. Thus, it is possible, for example, for the spring arms to be provided on a ring piece, which can be fixed to the valve member. If the spring arms are held on the valve member, the valve member is guided along the housing inner wall safely and without vibration already starting from the valve seat.

So that the spring arms of the interference-free securing function of the backflow preventer do not stand in the way, it is useful if the spring arms point with their free spring-arm end in a direction away from the valve seat.

The safe and low-vibration guidance of the valve member in the insert housing is improved more if the spring arms are spaced apart from each other uniformly in the peripheral direction of the backflow preventer.

A simple and smooth shifting motion of the valve member in the insert housing is aided if the spring arms are rounded and/or beveled in a region of their free spring arm ends.

An especially simple and advantageous configuration of the backflow preventer according to the invention provides that a ring seal effective in the closed position between the valve member and the valve seat is provided on the valve member periphery and that the spring arms are arranged on the side of the ring seal facing away from the valve seat.

To be able to guide the valve member securely and without vibrations also in the zone of its shifting motion away from the valve seat, it is advantageous when the valve member has a guide rod, which is guided displaceably in a guide opening of the insert housing, on its side facing away from the valve seat.

One preferred embodiment according to the invention provides that the backflow preventer is provided as a sanitary-system backflow preventer, which can be inserted preferably in a water line or a sanitary water discharge armature.

BRIEF DESCRIPTION OF THE DRAWINGS

Additional features of the invention follow from the description below of embodiments according to the invention in connection with the claims, as well as the drawing. The individual features can be reduced to practice by themselves or in combination for an embodiment according to the invention.

Shown are.

DETAILED DESCRIPTION OF THE PREFERRED EMBODIMENT

Figure 1:
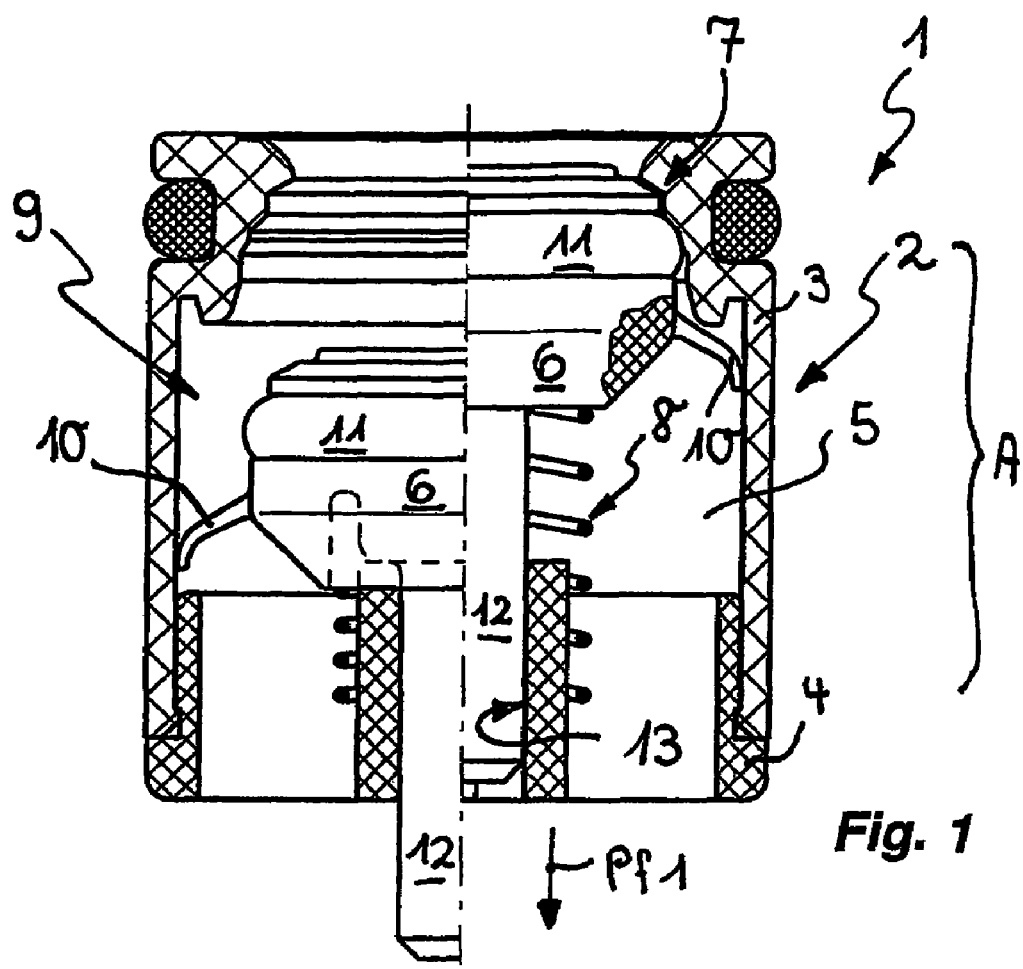
FIG. 1 a backflow preventer in a longitudinal cross-section, wherein the backflow preventer has in its insert housing a valve member, on which three spring-elastic spring arms are formed, which contact the housing inner wall, for no-play guidance in the insert housing, FIG. 2 the valve member of the backflow preventer shown in FIG. 1 in a plan view on a supply side, and FIG. 3 a view of a backflow preventer comparable in function with FIGS. 1 and 2, in which for no-play guidance of the valve member, spring-elastic spring arms are formed on the housing inner wall of its insert housing, wherein these spring arms already contact the outer periphery of the valve member in a spring-elastic and no-play way in the region of the valve seat.

In FIG. 1, a backflow preventer 1 is illustrated, which can be inserted into a sanitary gas line and preferably in a sanitary water line. The backflow preventer 1 has a two-part insert housing 2 with a supply-side sleeve-shaped housing part 3, which can be locked with a ring-shaped output-side housing part 4.

In the housing interior 5 surrounded by the housing parts 3, 4, there is a disk-shaped valve member 6, which forms a seal on a valve seat 7 in its closed position shown in the right half of FIG. 1.

The valve member 6 can be moved from its closed position outwards against the restoring force of a restoring spring 8 into its open position shown in the left half of FIG. 1. Here, the valve member 6 is moved by a fluid flowing in the provided flow direction Pf1 into its open position, while a backflow of the fluid in the opposite direction forces the valve member 6 more strongly against the valve seat 7.

From FIG. 1, it becomes clear that the housing interior 5 has an interior section A, which has a greater open cross section relative to the valve member outer periphery, in the movement zone of the valve body 6. In order to be able to guide the valve body 6 without play at least in its movement zone near to the valve seat 7 even for low quantities of fluid flow, a spring-elastic valve member guide 9 effective between the valve member 6 and the housing inner wall surrounding the interior section A is provided.

This valve member guide 9 is formed by three spring arms 10 spaced apart from each other approximately uniformly in the peripheral direction of the valve member 6 in the backflow preventer 1 illustrated in FIG. 1.

Figure 2:
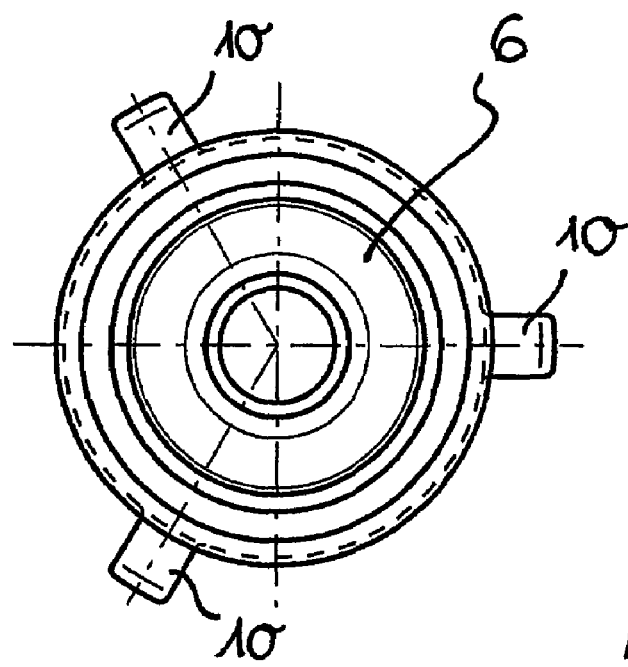

As becomes clear from the plan view of the supply side of the valve member 6 in FIG. 2, the spring arms 10 are formed integrally on the valve member 6 and projecting radially outwards past the valve member 6 and are spaced apart from each other approximately uniformly in the peripheral direction of the valve member 6, and are movable with their free spring arm end regions on the housing inner wall of the insert housing 2.

In order to not hinder the interference-free restoring movement of the valve member 6 from its open position into its closed or resting position, the spring arms 10 point in a direction away from the valve seat 7 with their free, rounded, or beveled spring arm end regions that contacting the housing inner wall. On the valve member periphery, there is a ring seal 11 effective between the valve member 6 and the valve seat 7 in the closed position. Here, the spring arms 10 are arranged on the side of the ring seal 11 facing away from the valve seat 7.

Figure 3:
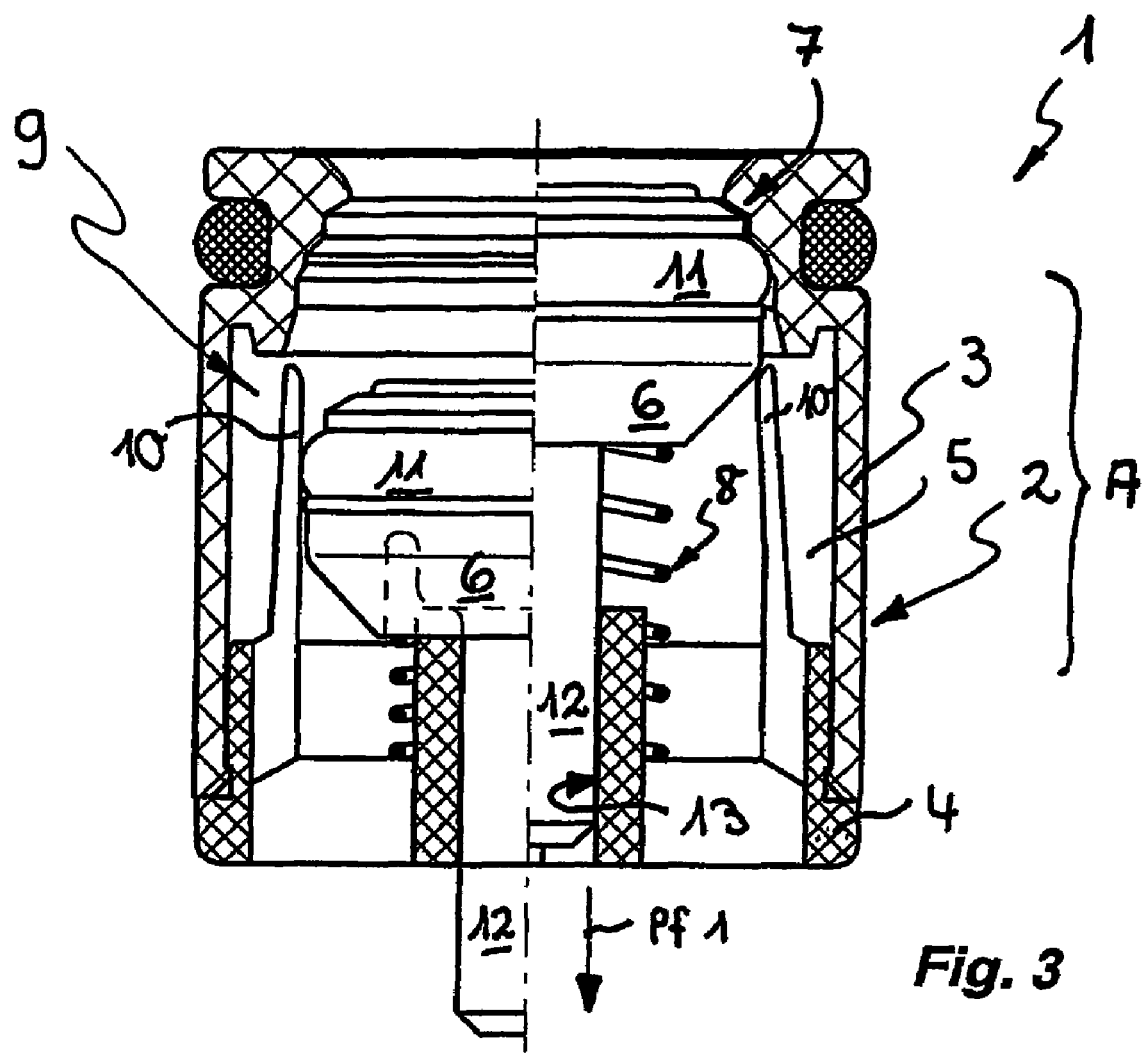

In FIG. 3, a backflow preventer 1 is shown, which is comparable in function with the backflow preventer 1 from FIGS. 1 and 2. The backflow preventer 1 from FIG. 3 also has a spring-elastic valve member guide 9, which is effective between the valve member 6 and the housing inner wall surrounding the interior section A for play-free guidance of the valve member 6 at least in its movement zone near to the valve seat 7. This valve member guide 9 is formed by several spring arms 10, which are formed on the inside on the insert housing 2 and which are arranged with their free spring arm end in the region of the valve seat 7 for the backflow preventer 1 of FIG. 3. For the embodiment illustrated in FIG. 3, the spring arms 10 formed on the insert housing 2 hold the valve body 6 in the region of the valve seat 7 with their spring-elastic spring arm ends.

From FIGS. 1 and 3 it becomes clear that on the side of the valve member 6 facing away from the valve seat 7, there is a guide rod 12, which is guided displaceably in a guide opening 13 of the insert housing 2. This guide rod 12 guarantees that the backflow preventer 1 is guided reliably in the housing interior 5 in its movement zone away from the valve seat 7.

The invention claimed is:

1. Backflow preventer (1), comprising an insert housing (2) with a housing interior (5) in which a valve member (6) is located which contacts a valve seat (7) in a closed position thereof and which can be moved against a restoring force from the closed position into an open position, wherein the housing interior (5) has, in a movement zone of the valve member (6), an interior section (A), which has a greater open cross section relative to an outer periphery of the valve member, wherein for play-free guidance of the valve member (6) there is a spring-elastic valve member guide (9) having at least two spring arms (10) formed on an inner portion of the insert housing (2) between which the valve member slides, the spring arms arranged with free spring arm ends thereof in a region of the valve seat (7), the spring arms are substantially parallel to a movement direction of the valve member (6) and contact at least one of the housing inner wall or the valve member (6), the spring-elastic valve member guide (9) being effective between the valve member (6) and a housing inner wall surrounding the interior section (A).

2. Backflow preventer according to claim 1, wherein the valve member guide (9) is effective at least in the movement zone of the valve member (6) in proximity to the valve seat.

3. Backflow preventer according to claim 1, wherein the spring arms (10) are spaced apart from each other uniformly in a peripheral direction of the backflow preventer (1).

4. Backflow preventer according to claim 1, wherein a ring seal (11), which is effective between the valve member (6) and the valve seat (7) in the closed position, is provided on a periphery of the valve member and the spring arms (10) are arranged on a side of the ring seal (11) facing away from the valve seat (7).

5. Backflow preventer according to claim 1, wherein the valve member (6) has on a side facing away from the valve seat (7) a guide rod (12), which is guided displaceably in a guide opening (13) of the insert housing (2).

6. Backflow preventer according to claim 1, wherein the backflow preventer (1) comprises a sanitary backflow preventer, adapted for insertion into a water line or a sanitary water discharge armature.

* * * * *